(No Model.)
E. GILMORE.
GRATER.
No. 582,014. Patented May 4, 1897.
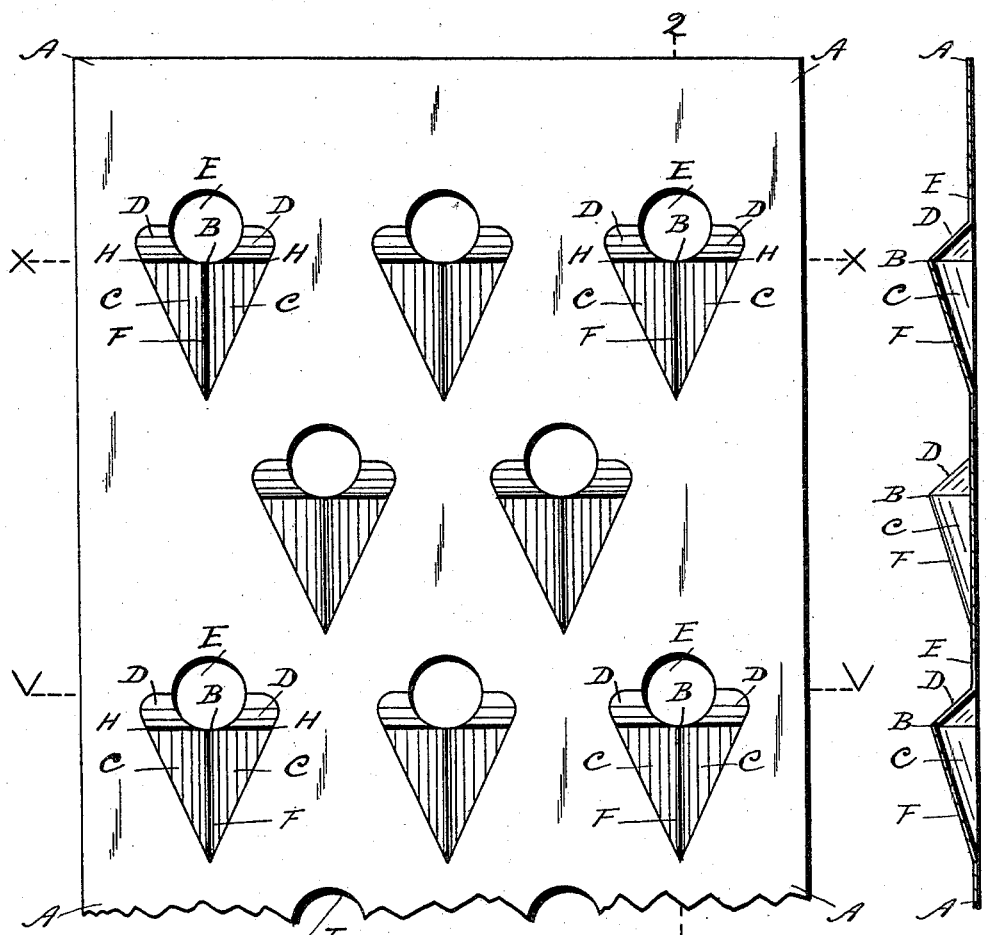
Fig. I.
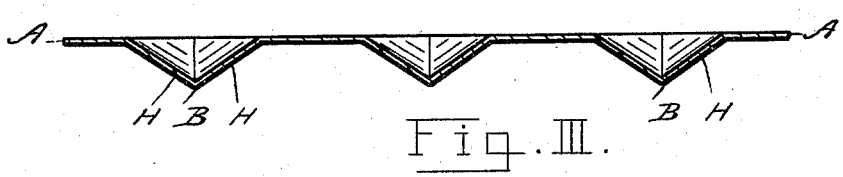
Fig. III.
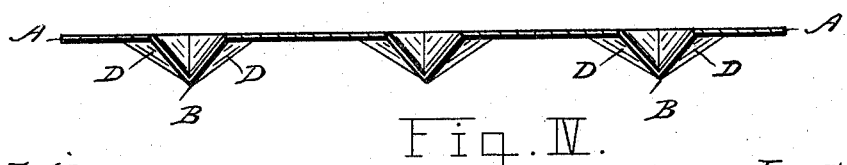
Fig. IV.
Witnesses.
B. E. Herald
Alfred Young
Inventor.
Evangeline Gilmore
By her Atty, John R. Bendy

UNITED STATES PATENT OFFICE.

EVANGELINE GILMORE, OF HAMILTON, CANADA.

GRATER.

SPECIFICATION forming part of Letters Patent No. 582,014, dated May 4, 1897.

Application filed July 6, 1896. Serial No. 598,101. (No model.)

*To all whom it may concern:*

Be it known that I, EVANGELINE GILMORE, a citizen of Canada, and a resident of Hamilton, in the county of Wentworth and Province of Ontario, Canada, have invented new and useful Improvements in Graters, of which the following is a specification.

My invention relates to improvements in vegetable and fruit graters, consisting of a light metallic plate having a number of series of raised cutters with rear apertures forming a part of said plate. Each of these raised cutters forms an angle and apex. The two sides and the upper part thereof slope from said apex down to the face of the plate, the center of each circle is in horizontal line with the upper extreme or level part of the cutter, and the lower part of the circular apertures are in line or engage with the apex of the cutters, each of the series being identical.

The objects of my improvements are, first, to provide a grater that is capable of reducing to small particles various kinds of vegetables, fruits, and spices; second, to provide an effective, clean-cutting grater at each downward stroke only, and, third, to afford facilities for the proper construction, formation, and effective qualities of the cutters by the shape and location of the circular apertures. I attain these objects by the mechanism illustrated in the accompanying drawings, in which—

Figure 1 is a face elevation of my improved grater, showing especially the location of each circular aperture in relation to the raised cutter and the particular shape of each cutter. Fig. 2 is a sectional elevation of the same through the broken line 2 2. Fig. 3 is a section of Fig. 1 through the broken line X X. Fig. 4 is a section of Fig. 1 through the broken line V V. All these distinctive views are very much enlarged in order to show more definitely the shape and constructive formation of the graters, raised cutters, and the exact shape and location of each cutter's aperture.

Similar letters refer to similar parts throughout the several views.

In the drawings the light metallic plate is indicated by the letter A, the face of which may be of convex formation, if desired. The raised graters or cutters have the apex of each indicated by B, the sloping angle sides by C, and the upper slopes by D.

E are the circular apertures, one to each cutter, and when the grater is being constructed the said apertures are first drilled or punched. Afterward the raised cutters are stamped from the rear side to conform in shape and thickness to the face side. The lower semicircular half of each circular aperture forms the cutting part of each cutter, and the apertures, in conjunction with the depressions formed in rear of the plate by the raised cutters, form exits for the grated material, this circular shape of apertures materially assisting the exit, therefore being very important in this matter, as well as in the more perfect and easy construction of the grater. The central vertical line F of each cutter, from the apex downward, is one gradual slope to the face or guiding part of the grater; also, the horizontal side lines H slope gradually, forming an angle down from the apex to the face of the grater. Thus it will be perceived that the actual grater or cutting part of this grater is the whole of the upper concaved or semicircular part of the cutters, which are formed by the lower semicircular part of the apertures, the said cutting parts being raised on an incline above the plane or face of the grater, the highest part being the apex B, all other parts sloping gradually therefrom.

What I claim as my invention, and desire to secure by Letters Patent, is—

In a vegetable and fruit grater a metallic plate having a number of series of raised cutters, each of which forms an angle and apex, the two sides and the upper part thereof sloping from said apex to the face of said plate, circular aperture through each upper part of said cutter, the lower part of aperture on a line with said apex the lower half of each aperture forming the sloping semicircular and angle cutting part of the cutters, substantially as described and set forth.

EVANGELINE GILMORE.

Witnesses:
 J. H. HENDRY,
 B. E. HERALD.